Aug. 13, 1935.　　　W. E. SYKES　　　2,010,970
MACHINE FOR CUTTING HELICAL GEARS
Filed Aug. 6, 1930　　　9 Sheets-Sheet 1

Aug. 13, 1935.  W. E. SYKES  2,010,970
MACHINE FOR CUTTING HELICAL GEARS
Filed Aug. 6, 1930  9 Sheets-Sheet 2

Aug. 13, 1935.  W. E. SYKES  2,010,970
MACHINE FOR CUTTING HELICAL GEARS
Filed Aug. 6, 1930  9 Sheets-Sheet 3

Inventor
William E. Sykes
By Rockwell & Bartholow
Attorneys

Aug. 13, 1935.  W. E. SYKES  2,010,970
MACHINE FOR CUTTING HELICAL GEARS
Filed Aug. 6, 1930  9 Sheets-Sheet 4

Inventor
William E. Sykes
By Rockwell and Bartholow
Attorneys

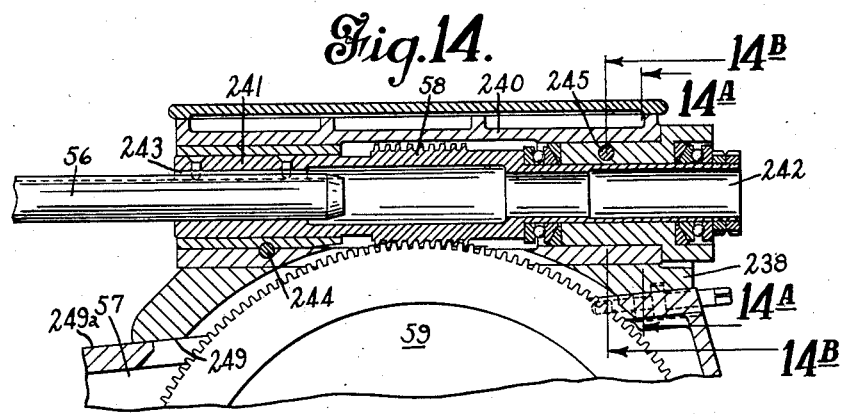
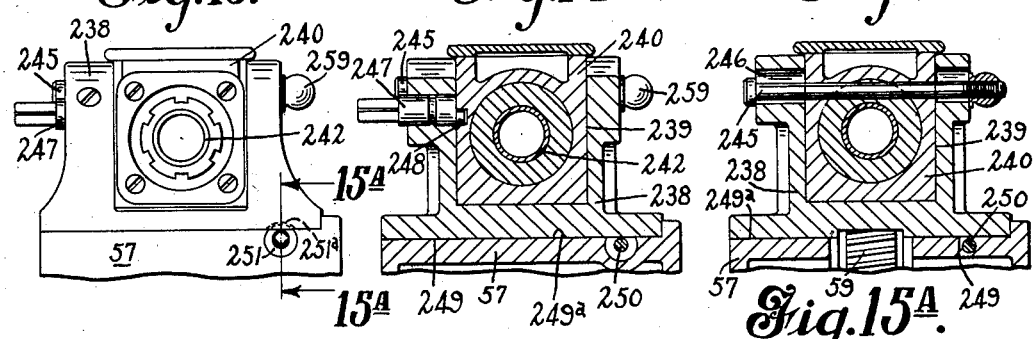
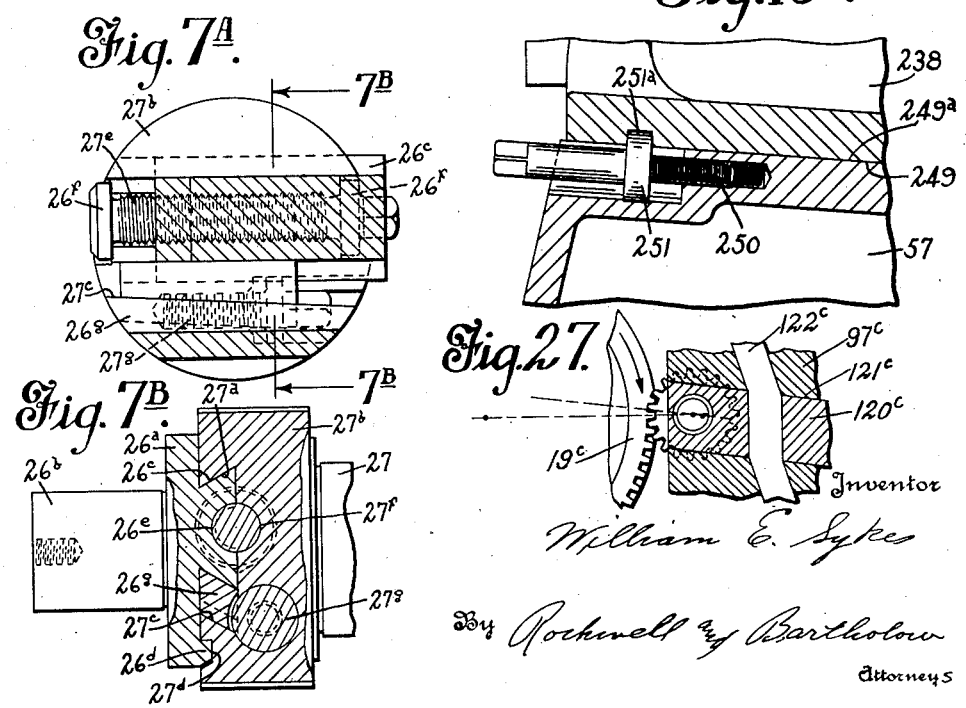

Aug. 13, 1935.   W. E. SYKES   2,010,970
MACHINE FOR CUTTING HELICAL GEARS
Filed Aug. 6, 1930   9 Sheets-Sheet 6
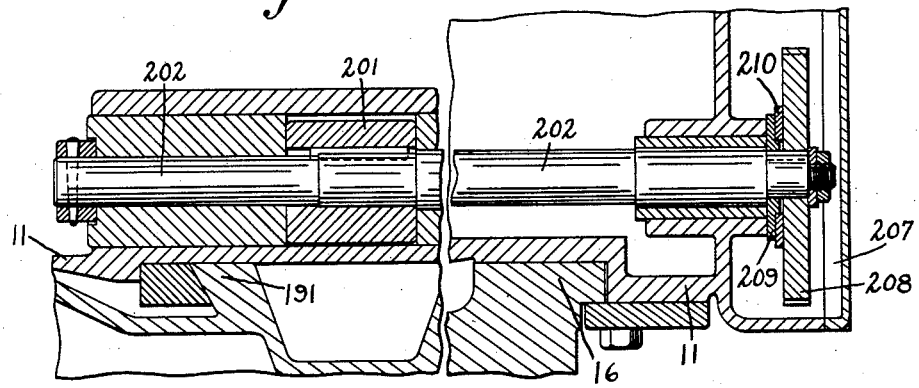
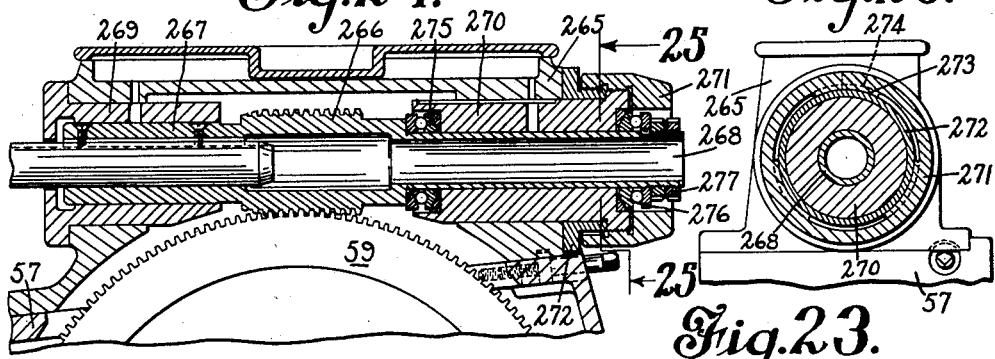
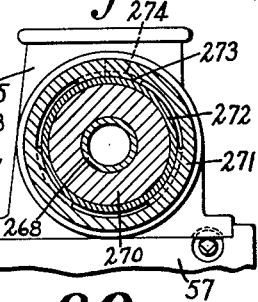
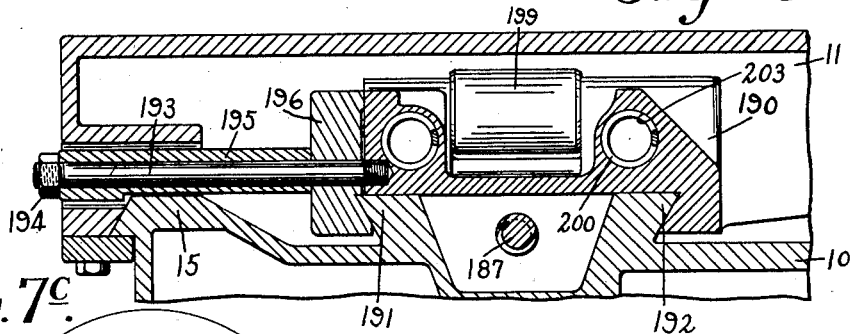
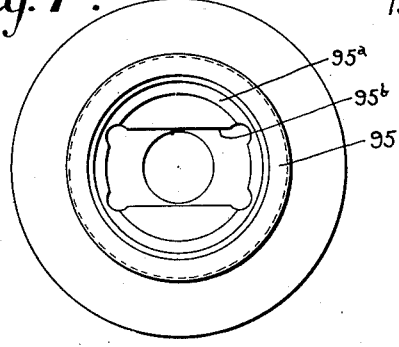
Inventor
William E. Sykes
By Rockwell & Bartholow
Attorneys Aug. 13, 1935.  W. E. SYKES  2,010,970
MACHINE FOR CUTTING HELICAL GEARS
Filed Aug. 6, 1930  9 Sheets-Sheet 7
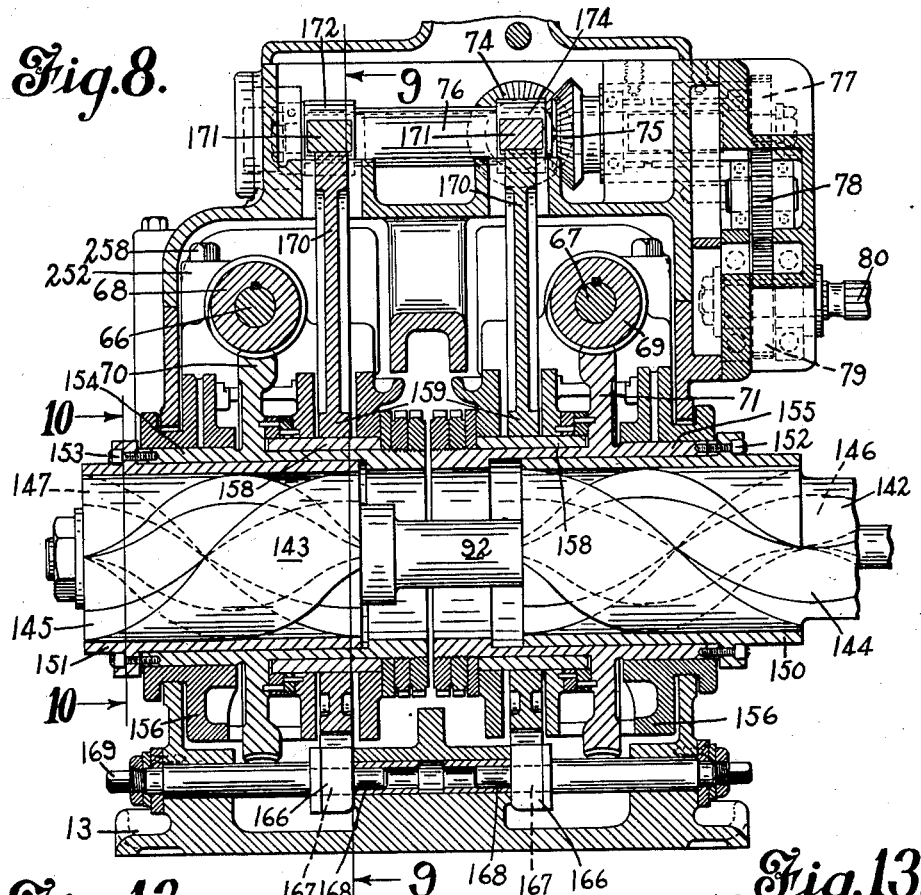

Aug. 13, 1935. W. E. SYKES 2,010,970
MACHINE FOR CUTTING HELICAL GEARS
Filed Aug. 6, 1930 9 Sheets-Sheet 8
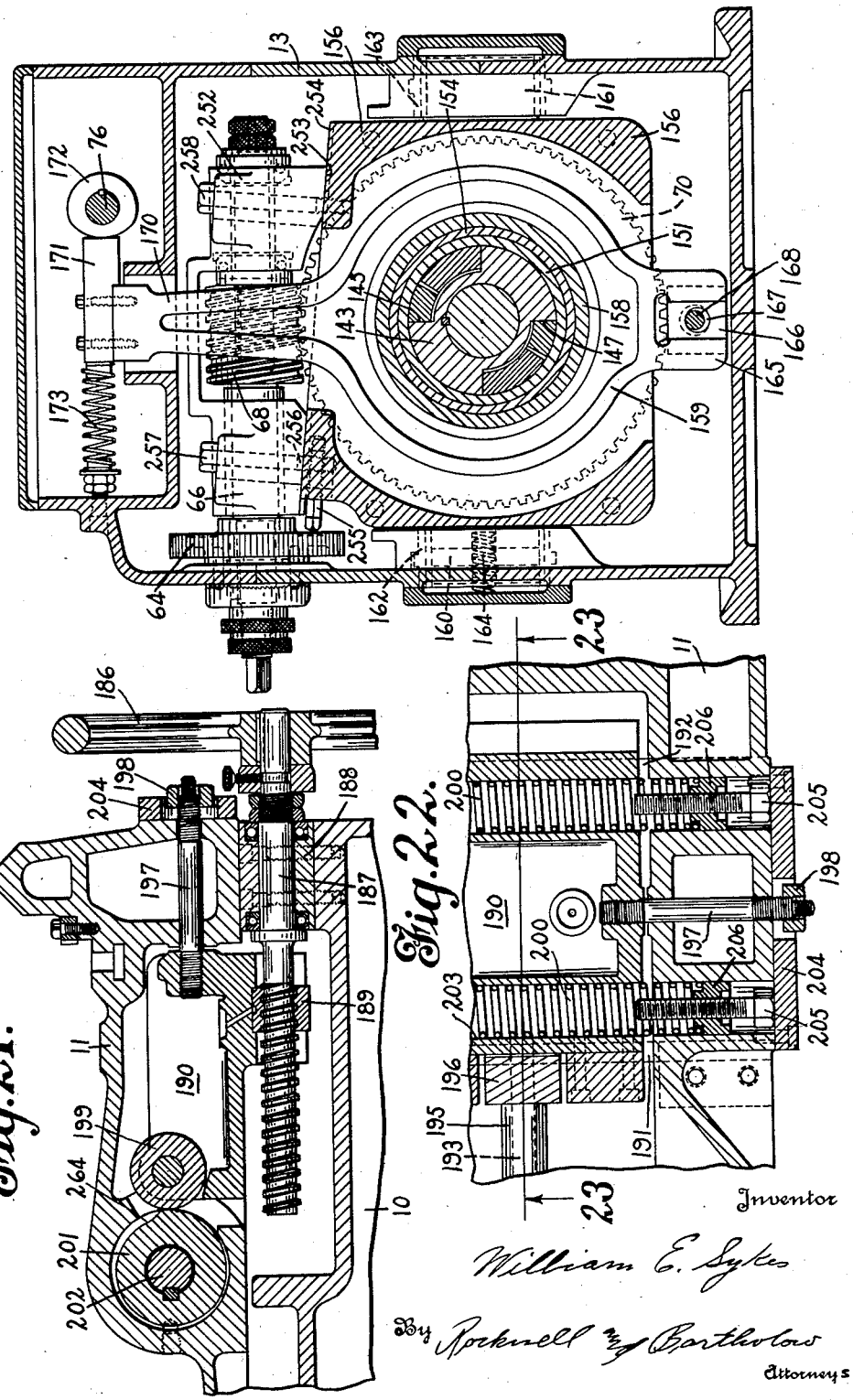

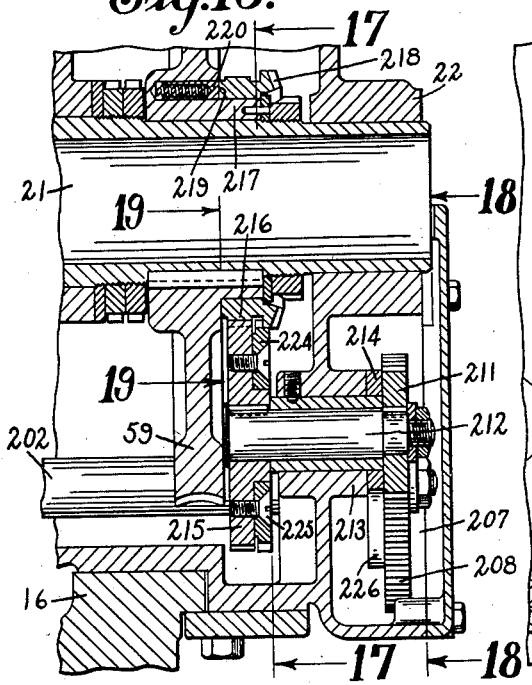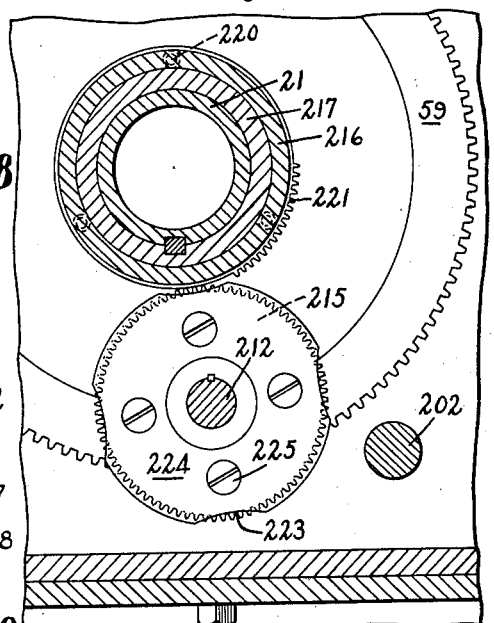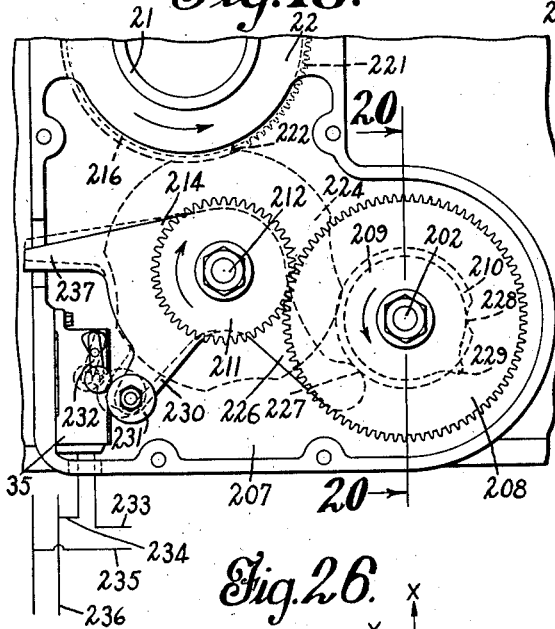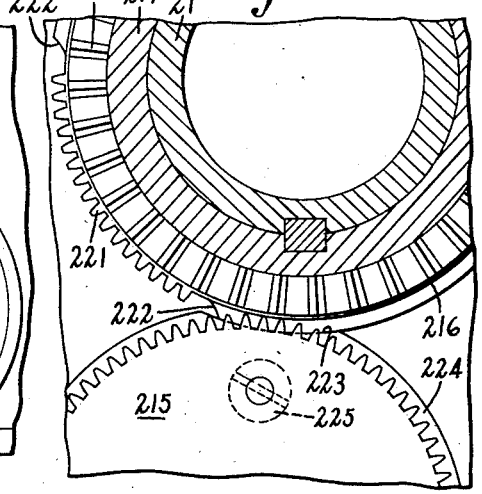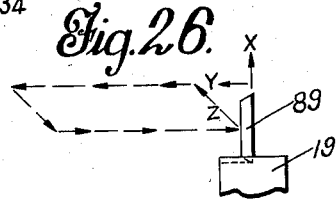

Patented Aug. 13, 1935

2,010,970

UNITED STATES PATENT OFFICE 2,010,970

MACHINE FOR CUTTING HELICAL GEARS

William E. Sykes, Buffalo, N. Y.

Application August 6, 1930, Serial No. 473,331

59 Claims. (Cl. 90—9)

This invention relates to improvements in machines for forming the teeth of gears, and while the invention comprises certain features which will be found advantageous in cutting straight toothed gears, such as spur gears and pinions for example, it is more particularly concerned with a machine for the cutting of helical or double helical teeth upon a gear blank in which one or more cutters are moved across the face of the gear blank during the cutting operation. The cutters are given, besides this reciprocatory movement across the face of the blank, a helical or twisting movement when cutting helical teeth, a bodily relieving movement to enable them to clear the work during their inoperative strokes, and to both cutters and work is imparted a continuous generating feeding or indexing movement to present the entire surface of the blank to the cutters.

The present application deals particularly with improvements in machines of the general type shown in my prior Patents No. 1,750,029, March 11, 1930, and No. 1,814,348, July 14, 1931, and is concerned with certain features of construction designed to improve by speeding up the operation, simplifying the structure and increasing the efficiency of the operation of machines of this character. This invention seeks to improve the operation and product of machines of this character by simplifying and improving the structure of the driving mechanism, the cutter relief mechanism, the cutter adjusting mechanism, by the provision of mechanism whereby the machine will be substantially automatic in its operation, and by the provision of other improved features.

One object of my invention is to provide an improved gear cutting or generating machine.

Another is to provide a gear cutting or generating machine that will be substantially automatic in its action whereby gears may be formed thereon on a quantity production basis.

Another object is to provide mechanism in a gear cutting or generating machine that will gradually and automatically feed the work and tool relatively toward each other, and at the completion of the operation separate them and stop the machine.

Still another object is to provide an improved tool relief mechanism whereby the relieving action of the tool will be more positive and accurate, as well as substantially smooth and silent.

Other objects of this invention include the provision of improved mechanism for adjusting and locking the tool carriers in working position, of a substantially self-aligning and readily adjustable cutter indexing mechanism, of improved and readily adjustable guiding mechanism for the cutters, of a disengaging and easily adjustable work indexing mechanism, of an improved clutch mechanism, of an improved crank for the reciprocating carriage and of improved cutter spindle structures.

Further, the invention contemplates simplifying generally the operation of machines of this character and providing a combination of mechanisms which will be comparatively economical to manufacture and especially efficient in use.

To these and other ends, the invention consists in the novel features and combinations of parts to be hereinafter described and claimed.

In the accompanying drawings:

Fig. 5 is a sectional view on line 5—5 of Fig. 1;

Fig. 5A is a sectional view of a modified form of clutch mechanism;

Fig. 7A is a section 7A—7A of Fig. 7;

Fig. 7B is a section 7B—7B of Fig. 7A;

Fig. 7C is a detail end view of one of the cutter spindles;

Fig. 8 is a sectional view on line 8—8 of Fig. 1;

Fig. 9 is a sectional view on line 9—9 of Fig. 8;

Fig. 10 is a sectional view on line 10—10 of Fig. 8;

Fig. 11 is a development of the cutter guides along line 11—11 of Fig. 10;

Fig. 12 is a sectional view on line 12—12 of Fig. 2;

Fig. 13 is a sectional view on line 13—13 of Fig. 2;

Fig. 14 is a sectional view on line 14—14 of Fig. 2;

Fig. 14A is a sectional view on line 14A—14A of Fig. 14;

Fig. 14B is a sectional view on line 14B—14B of Fig. 14;

Fig. 15 is an end view of the parts shown in Fig. 14;

Fig. 15A is a sectional view on line 15A—15A of Fig. 15;

Fig. 16 is a sectional view on line 16—16 of Fig. 4;

Fig. 17 is a sectional view on line 17—17 of Fig. 16;

Fig. 18 is a sectional view on line 18—18 of Fig. 16;

Fig. 19 is a sectional view on line 19—19 of Fig. 16;

Fig. 20 is a sectional view on line 20—20 of Fig. 18;

Fig. 21 is a sectional view on line 21—21 of Fig. 1;

Fig. 22 is a sectional view on line 22—22 of Fig. 2;

Fig. 23 is a sectional view on line 23—23 of Fig. 22;

Fig. 24 is a longitudinal section of a modified form of index wheel drive mechanism;

Fig. 25 is a sectional view on line 25—25 of Fig. 24;

Fig. 26 is a diagram illustrating the movement of the cutter or tool during operation and resulting from the use of my improved relief mechanism, and Fig. 27 is a view somewhat diagrammatic showing a somewhat modified form of tool relief and tool carrier guiding mechanism.

Figure 1:
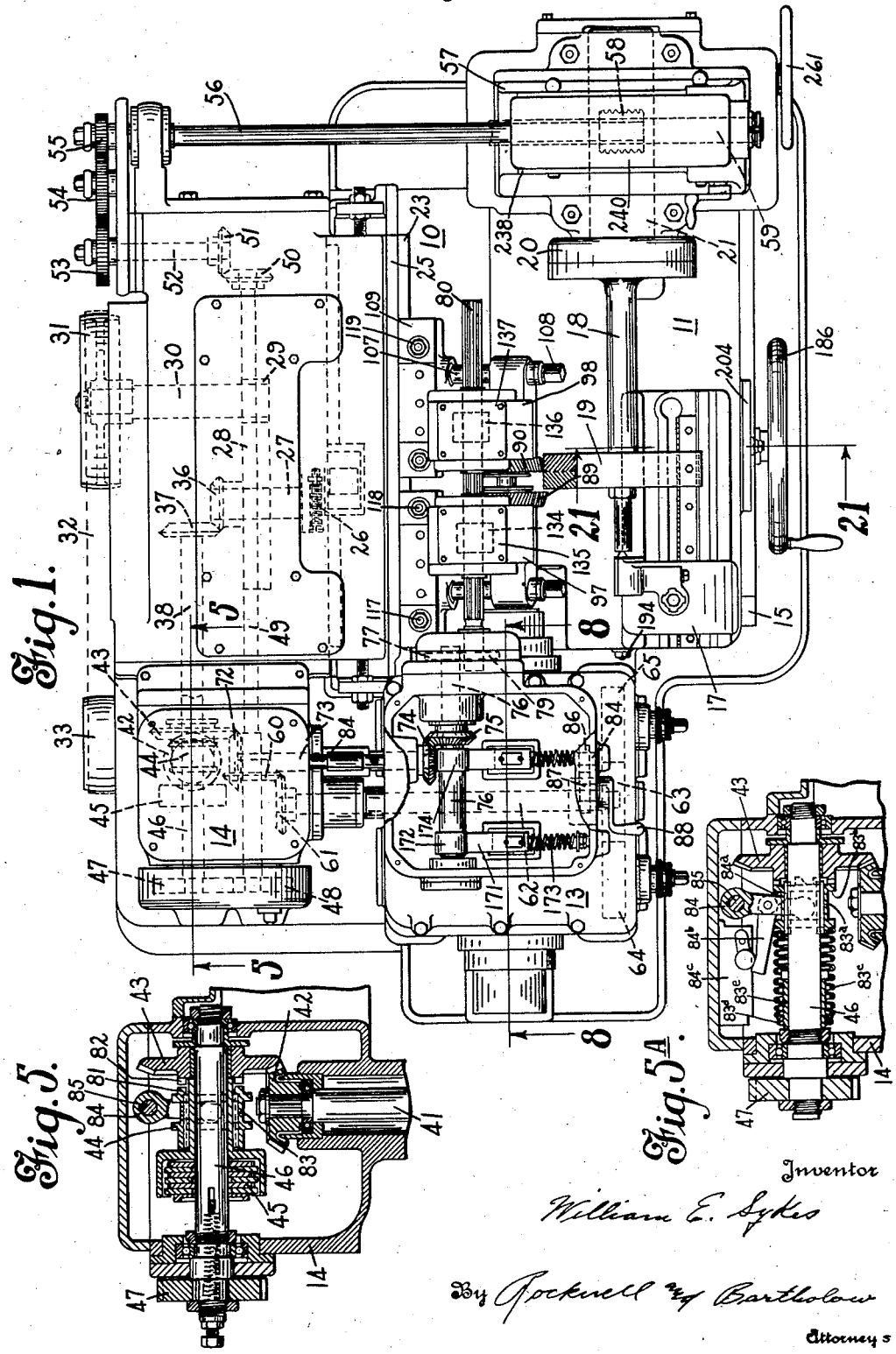
Fig. 1 is a plan view of a gear cutting machine, embodying the features and improvements of my invention.
Figure 2:
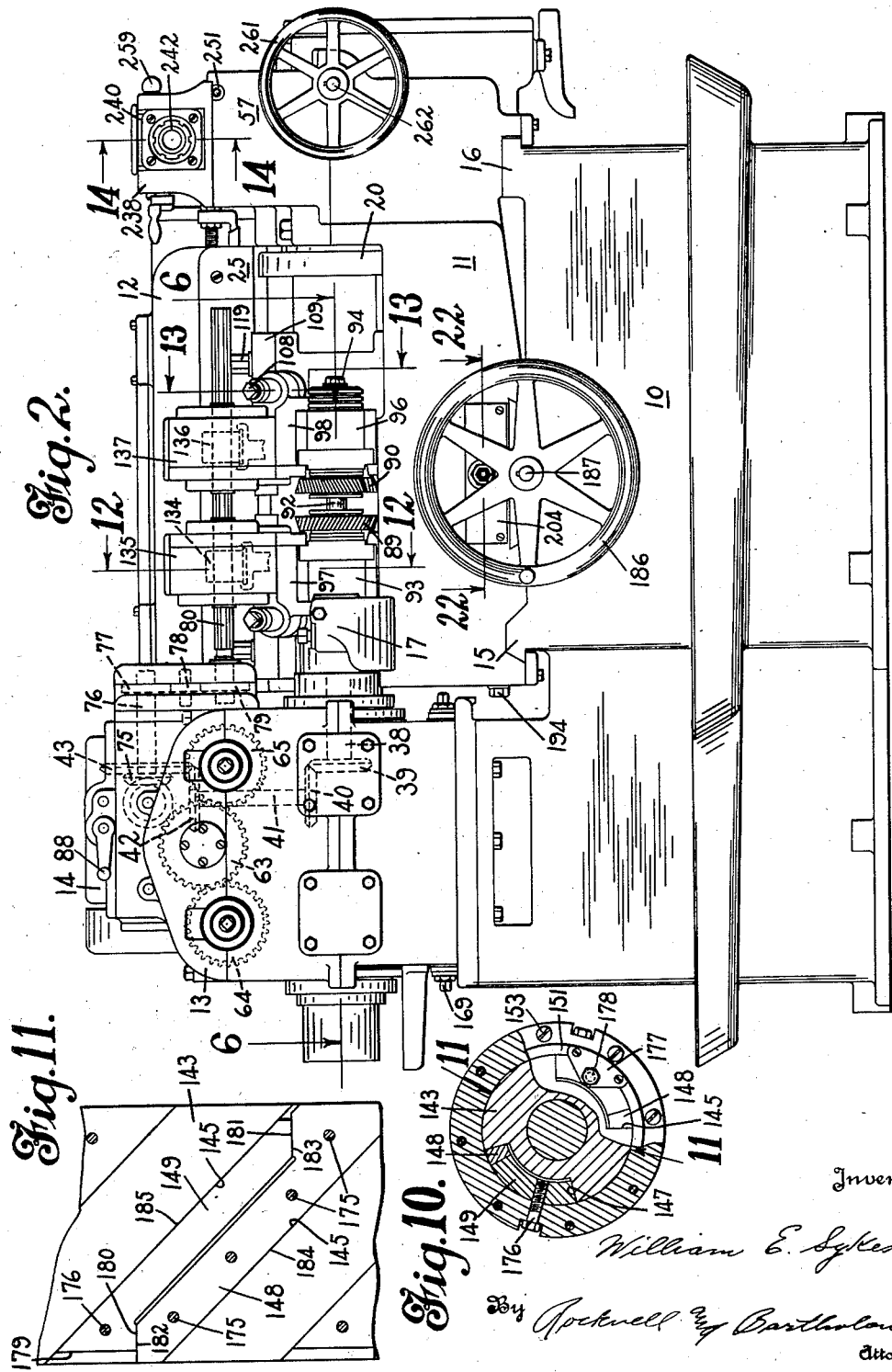
Fig. 2 is a front elevation of the machine shown in Fig. 1.
Figure 3:
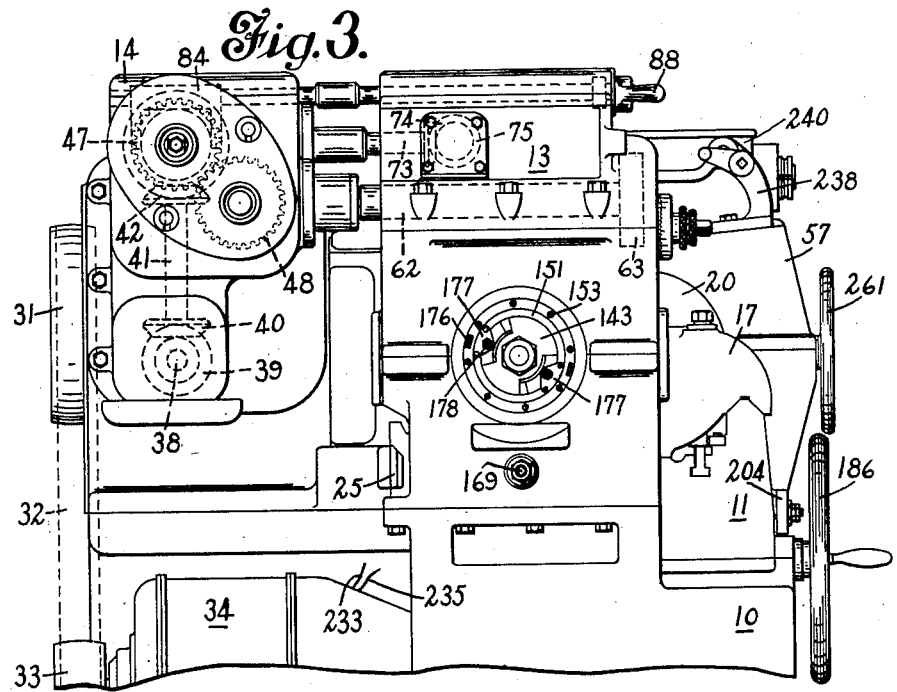
Fig. 3 is a left-hand side view of a part of the machine.
Figure 4:
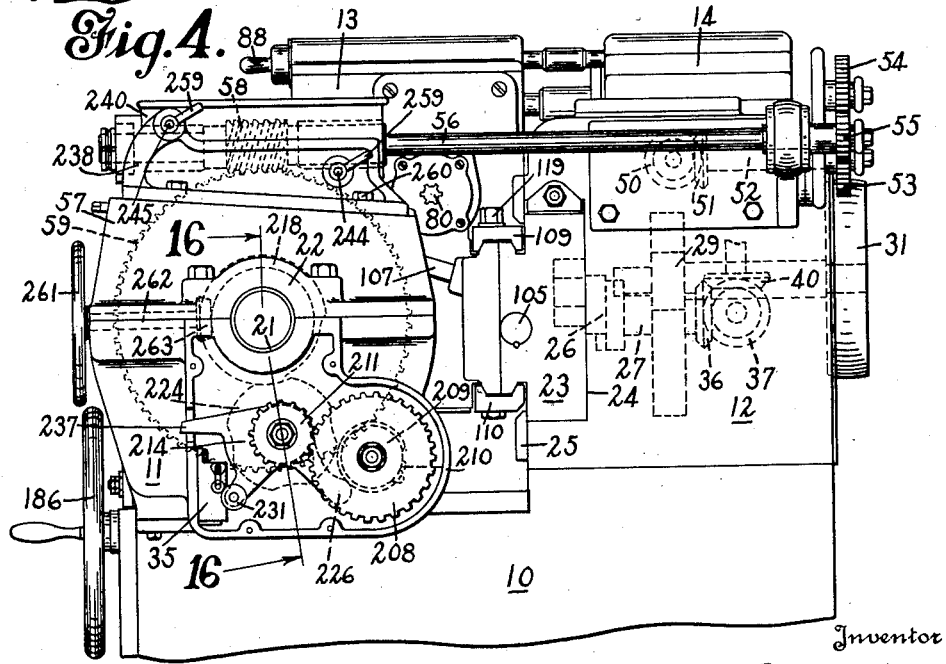
Fig. 4 is a right-hand side view of part of the machine.

The machine selected to illustrate the features and improvements of this invention is generally shown in Figs. 1 to 4 inclusive. A machine base 10 is provided, upon the forward portion of the upper surface of which a work supporting base 11 is slidably mounted. A cutter carriage base 12 is mounted upon the upper surface of the rear portion of the machine base 10. A cutter control housing 13 is mounted upon the upper surface of the forward portion of the machine base 10, and a gear and control housing 14 is mounted upon the upper surface of the rear portion of machine base 10. The work base 11 is slidable forwardly and rearwardly upon the machine base 10, on ways 15 and 16. A tail stock 17 is mounted upon the work base 11, and supports an end of a work arbor 18 upon which work 19, comprising a gear blank, may be mounted and secured. The work arbor 18 is secured to a face plate 20, which in turn is secured to a hollow shaft 21. The hollow shaft 21 is journaled in bearings 22, formed in a part of the work base 11, one of such bearings being shown in Fig. 16.

The carriage base 12 is rigidly secured to base 10, and disposed to the rear of the work base 11. A carriage 23 is reciprocably supported upon the carriage base 12, being mounted in a guideway 24, and retained therein by keeper plates 25. The carriage 23 is reciprocated by suitable crank shaft mechanism 26, having a shaft 27 connected thereto, which is driven by means of the cooperation of a gear 28 secured thereto with a pinion 29 secured upon a shaft 30. In order to improve the operation of the machine, the crank shaft mechanism 26 engages the carriage substantially midway between the ends thereof instead of at one end. Evenness in operation and of wear upon the ways 24 results due to this arrangement. The shaft 30 is driven by a pulley 31, which is secured thereto and is driven by a belt 32 from a pulley 33. The pulley 33 is secured to the armature shaft of an electric motor 34. The operation of the motor 34 may be controlled in the usual manner and also by means of a cutout switch 35 (see Figs. 4 and 18).

Figure 7:
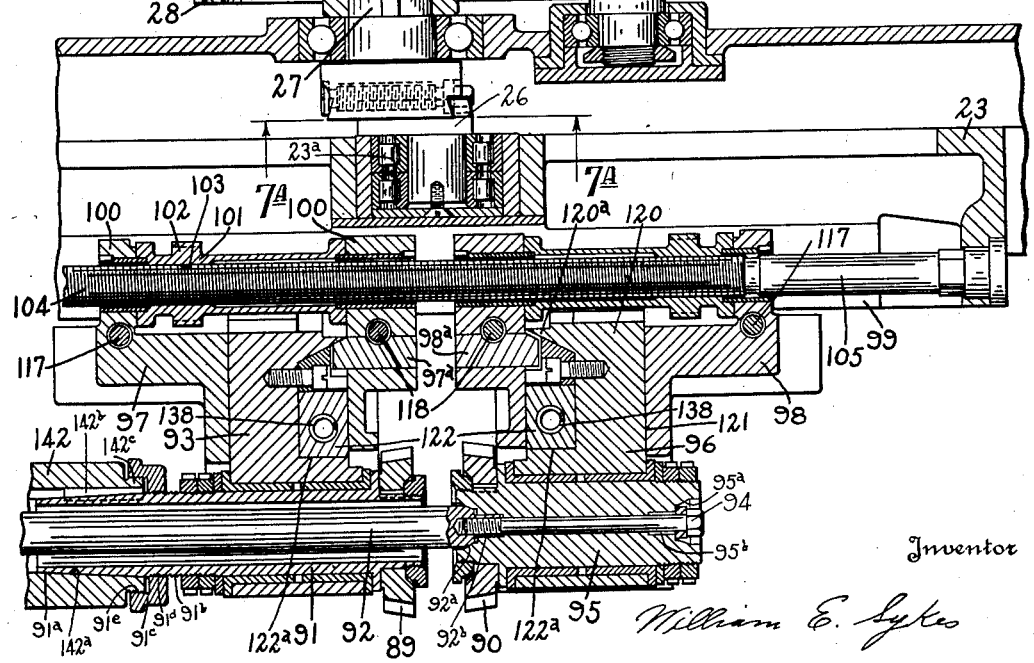
Fig. 7 is a continuation of Fig. 6.

The crank shaft mechanism 26, Figs. 7, 7A, and 7B, comprises a plate-like member 26$^a$ having a stud shaft 26$^b$ extending from one end face thereof and preferably integral therewith, and which is received in a roller bearing 23$^a$, mounted in carriage 23. The member 26$^a$ is provided with a dove-tailed tongue 26$^c$ on an end face thereof. The tongue 26$^c$ is slidably received in a dove-tail groove 27$^a$ formed in a plate member 27$^b$ that is preferably integral with the shaft 27. One side 27$^c$ of the groove 27$^a$ is disposed at an angle to the other. The plate members 26$^a$ and 27$^b$, by the above connection, are permitted to slide relatively to each other transversely with respect to the axis of shaft 27, so that the amount stud shaft 26$^b$ is eccentric to shaft 27 may be varied. Plate member 26$^a$ is also provided with a rib 26$^d$ that is received in a groove 27$^d$ in plate member 27$^b$ to insure axial movement of one plate member relatively to the other.

An adjusting screw 27$^e$ extends across plates 26$^a$ and 27$^b$, and is disposed in a threaded groove 26$^e$ and the unthreaded groove 27$^f$ respectively formed in the abutting faces of the plate members. The adjusting screw 27$^e$ is headed at both ends as at 26$^f$, plate 27$^b$ being counterbored to pass each head 26$^f$ while said heads engage opposite ends of tongue 26$^c$. Rotation of screw 27$^e$ will move plate 26$^a$ relatively to plate 27$^b$ in the direction desired.

A tapered shim 26$^g$ is disposed between one side of tongue 26$^c$ and the angularly disposed side 27$^c$ of groove 27$^a$. A collar screw 27$^g$, the collar of which engages shim 26$^g$ within a slot provided therein, is threaded into plate 27$^b$ and by rotation in one direction is adapted to force shim 26$^g$ in one direction to wedge it between the tongue 26$^c$ and groove side 27$^c$ of plate 27$^b$, to lock these parts together and by rotation in the other direction to loosen the arrangement to permit adjustment of one plate relatively to the other.

A bevel gear 36 on shaft 27 meshes with and drives a bevel gear 37 on a shaft 38. A bevel gear 39 on shaft 38 meshes with and drives a bevel gear 40, secured upon a vertical shaft 41 that enters the gear and control housing 14. A bevel gear 42 on shaft 41 meshes with and drives a large bevel gear 43, which by means of a clutch 44 and through a friction drive mechanism 45 drives shaft 46 upon which gear 43 is rotatably mounted. A gear 47 secured upon shaft 46 meshes with and drives a gear 48 secured to a horizontal shaft 49. A bevel gear 50 secured to shaft 49 meshes with and drives a bevel gear 51, secured to a shaft 52, upon which a gear 53 of a set of change gears 53, 54, and 55 is secured. Gear 55 of this set of change gears is secured to a forwardly directed shaft 56, that enters a work index mechanism housing 57, secured to work base 11 and is slidably connected to a worm 58, disposed therein to rotate the same. The worm 58 meshes with and drives a work indexing worm wheel 59 that is drivingly connected to the hollow shaft 21.

A bevel gear 60, secured to shaft 49 within the gear housing 14, meshes with and drives a bevel gear 61, secured to a forwardly directed shaft 62, that passes substantially through cutter control housing 13. A gear 63, secured to shaft 62 within housing 13, meshes with a pair of gears 64 and 65, one of which is disposed on either side of gear 63, and which are secured respectively to shafts 66 and 67. A worm 68 is secured to shaft 66, and a worm 69 is secured to shaft 67 within housing 13. The worms 68 and 69 mesh with and drive respectively cutter index worm wheels 70 and 71.

A bevel gear 72 meshes with and is driven by the bevel gear 43. Gear 72 is secured to a forwardly directed shaft 73 and extends into housing 13. A bevel gear 74, secured to shaft 73, within the housing 13 meshes with and drives a bevel gear 75, secured to a shaft 76, to which is secured a gear 77 that, through an idler pinion 78, drives a gear 79, secured upon a shaft 80, that extends across the machine in front of the carriage 23.

The clutch 44, by means of cooperating clutch teeth 81 and 82, formed respectively on a shiftable clutch member 83 and gear 43, connects shaft 46 to gear 43 to be driven thereby. A clutch operating yoke 84 is secured to a rod 85 that extends forwardly into housing 13. The rod 85 has a gear 86 secured thereto, which meshes with and is driven by a gear 87. The gear 87 may be rotated by means of a handle 88, connected thereto by a short shaft. The handle 88 is disposed upon the front face of housing 13 and by manipulation thereof to rotate gear 87 in the proper direction, will shift clutch member 83 to connect the work and cutter indexing worm wheels 59 and 70 and 71 respectively, with the power driven bevel gear 43.

The modified form of clutch shown in Fig. 5A is adapted to be mounted upon shaft 46 in place of the clutch shown in Fig. 5, and will operate in such position when the shape of the clutch teeth formed upon the hub of bevel gear 43 is changed, as will hereinafter be described. The clutch operating yoke 84 and rod 85 need not be altered. A clutch sleeve 83a having a clutch yoke receiving groove 83b formed about its circumference is mounted upon shaft 46, being keyed thereto for rotation therewith, and being slidable relatively thereto. The sleeve 83a is normally retained with its clutch teeth in clutched relation with the clutch teeth upon gear 43 by a coiled spring 83c, the tension of which may be varied by means of nuts 83d that are threaded on a sleeve 83e, which in turn is secured to shaft 46. The groove 83b is wider than the width of yoke 84, permitting lost motion therebetween. A bell crank lever is pivoted to yoke 84, one arm 84a of this lever engaging one side of groove 83b and the other arm 84b extending outwardly and upwardly to engage the operating handle of a motor cutout switch 84c, that by suitable electrical connections is adapted to open the control circuits of motor 34 to stop the same.

The driving faces of the cooperating clutch teeth between sleeve 83a and the hub of gear 43, are inclined, as shown at 43a and tend to open the clutch whenever the force exerted thereon is sufficient to overcome the tension of spring 83c. The opening movement of the clutch whereby sleeve 83a is moved away from gear 43, due to the engagement of arm 84a with the sleeve 83a, rocks the bell crank lever causing arm 84b to shift the operating handle of switch 84c and stop motor 34. The force required to open the clutch, as above described, is in excess of the force required to operate the machine and is generally due to jams or other trouble of like nature in the parts driven by gear 43, and, therefore, this arrangement provides a safety means to prevent damage.

A pair of pinion-shaped cutters 89 and 90, having teeth resembling gear teeth formed upon the periphery thereof and adapted by having the opposing ends of the teeth thereof provided with cutting edges to cut material from the gear blank 19, by a reciprocating movement across the faces thereof, are secured to cutter shafts 91 and 92 respectively. Cutter shaft 91 is hollow and shaft 92 extends therethrough. The cutter shaft 91 is journaled in a cutter support 93, and cutter shaft 92 is secured by means of a bolt 94 to a spindle 95 that is journaled in a cutter support 96. The cutter supports 93 and 96 are slidably secured to cutter carriers 97 and 98 respectively, for movement relatively thereto transversely with respect to the cutter axes. The carriers 97 and 98 are slidably secured to the carriage 23 for movement in either direction therealong parallel to the reciprocatory movement thereof.

The spindle 95 is of such form that it may be reversed end for end in the support 96 to permit the disposition of cutter 90, as shown in Fig. 7, but spaced further from cutter 89 at the other side of holder 96. The counterbores at each end of the spindle 95 are, therefore, identically formed so as to properly receive the conical surface 92a and the rectangularly-shaped lug 92b, formed on the end of shaft 92. By tightening bolt 94 the conical surface 92a is drawn tightly against the surface of a similarly shaped counter-bore 95a in spindle 95, and retains the lug 92b within a similarly formed opening 95b in spindle 95 to provide an efficient and concentric driving connection between the shaft 92 and the spindle 95. By referring to Fig. 7C, the conical surface of counter-bore 95a of the spindle 95, is shown to be substantially continuous, thus insuring sufficient surface contact between shaft 92 and spindle 95 to insure that these parts will be retained with their axes in alignment.

The cutter carriers 97 and 98 are substantially the same in structure and are secured to and adjustable upon the carriage 23 in a similar manner and, therefore, only one set of structures will be described. Figs. 7 and 13 illustrate the manner of detachably securing the cutter carriers 97 and 98 to the carriage 23. The carriage 23 is provided with a guideway 99 in the front face thereof, into which a rearwardly extending bifurcated part 100 of each carrier extends and by which the carriers are guided. Between the separated portions of the part 100 is disposed a rotatable nut 101, having a spiral toothed pinion 102, formed integral therewith. The nut 101 is provided with internal threads 103 that cooperate with exterior threads 104, formed on a rod 105 that extends from end to end of the carriage 23, within the guideway 99, and is secured at each end thereof to the carriage 23 in such a manner that it is not permitted to rotate. A spiral toothed pinion 106 meshing with the pinion 102, is secured upon a shaft 107 that extends forwardly away from the carriage 23 to present its outer end at the front of the machine, whereby it is conveniently accessible. The shaft 107 is suitably journaled in the respective cutter carrier. By rotation of shaft 107 by means of a wrench in engagement with the forwardly disposed ends 108 thereof, the respective cutter carrier 97 or 98 may be moved longitudinally with respect to and along the carriage 23 in either direction.

The cutter carriers 97 and 98 may be clamped to the carriage 23 by means of U-shaped clamping bars 109 and 110, that due to beveled shoulders 111 and 112, formed on each and which cooperate with beveled shoulders 113 and 114 formed on the carriers, draw these parts together with the opposing surfaces 115 and 116 respectively, in tight engagement by means of bolts 117 and 118, the upper ends 119 of which are readily accessible from the top of the machine.

The cutter supports 93 and 96 are secured to the cutter carriers 97 and 98 respectively, in a similar manner and, therefore, only one will be described. Figs. 7 and 12 illustrate the slidable connection between these structures. The cutter supports are each provided with a rearwardly directed extension 120 that is slidably supported in a guideway 121, formed in the carriers 97 and 98, and may move relatively thereto, to carry the cutters toward or away from the gear blank being cut at substantially right angles to the axis thereof. The forward movement of the cutter supports is limited by means of stops 97a and 98a that are secured to carriers 97 and 98 respectively, and which are engaged by rear portions 120a formed on each support (see Fig. 7). A vertically disposed member 122 is slidably mounted in a guideway 122a, formed in each cutter support. The member 122 is provided with extensions 123 and 124 that are engaged in guideways 125 and 126 respectively, that are formed in the respective cutter carrier, above and below respectively the cutter support extending portion 120.

When cutting relatively straight-sided grooves or teeth, it has been found desirable to arrange the cutter support so that it will slide toward and away from the blank at right angles to the axis thereof and at a slight inclination to a horizontal radius thereof, and this has been effected in this instance by slightly inclining the guideway in which the rearwardly directed extension of the cutter supports are disposed. The inclination so provided will permit the cutting tool, during its relief movement, to be pulled not only directly away from the blank and out of the groove but also away from the side of the groove, which, due to the continuous generating or rotating movement given to the blank is approaching the side cutting edge of the tool. The inclination, therefore, is on a line directed at an angle from a line drawn through the center points of the blank and cutter, the line being inclined in the direction of the rotating movement of the blank or as it might be expressed, the inclination is on a line directed at an angle to the plane of the axes of both the blank and the cutter. This is illustrated in Fig. 27 wherein the extension 120c is slidably supported in a guideway 121c formed in carrier 97c, the guideway 121c being slightly inclined rearwardly and downwardly in the direction of rotation of gear blank 19c. Operation, as above described, of the relief mechanism and by movement of member 122c will cause the cutter to be pulled away from the blank to relieve its cutting edge both from the bottom and side of the groove or tooth being cut therein.

The front and rear guide surfaces 127 and 128 of extension 123, and the front and rear guide surfaces 129 and 130 of extension 124 are forwardly inclined so that movement of the member 122 downwardly will cause it to move bodily rearwardly therewith and away from the gear blank being cut. Movement of the member 122 upwardly will cause it to move bodily forwardly, carrying the respective cutter support forwardly or toward the gear blank being cut.

The upper extension 123 of member 122 is provided with a guideway 131 in which is slidably disposed a plunger 132. Suitable means, such as a screw stud 133, is provided whereby one of the plungers 132 of the machine may be longitudinally adjusted with respect to the extension 123 and upwardly toward a cam 134, which is disposed in a housing 135 formed integral with cutter carrier 97, and the other plunger 132 of the machine may be similarly adjusted upwardly and toward a cam 136 disposed in a housing 137, formed integral with cutter carrier 98. Cams 134 and 136 are slidably mounted upon shaft 80 for axial movement thereon while being secured thereto for rotation therewith. The housings 135 and 137 entirely enclose the cams and the cooperating plungers 132 so as to permit the immersion of these parts in oil.

A compression spring 138 disposed in an opening 139 extending upwardly through the lower extension 124 of member 122 and into the body portion thereof, acts against a plate 140 secured to the lower surface of the respective cutter carrier to constantly urge the member 122 upwardly to maintain the plungers 132 in contact with the peripheral surface 141 of the respective cam 134 or 136. The peripheral surface 141 of each cam, by its action upon the member 122 through plunger 132, is formed to move member 122 downwardly whereby the respective cutter will be moved away from the blank being cut, and to maintain the member 122 in such position during the non-cutting operation, and then to abruptly permit the member 122 by the action of the spring 138 to move upwardly whereby the respective cutter will be moved toward the blank, and to maintain the member 122 in such position during the cutting operation. In order to insure positive action of plungers 132, a resilient strap 132a, preferably of spring steel, may be connected at each end to the plunger and looped over the respective cam 134 or 136 whereby rotation of such cam will raise as well as lower the respective plunger. Such an arrangement is shown in Fig. 12. The cams 134 and 136 may be arranged upon shaft 80 in such a manner that as one cutter is moved toward the blank to start cutting, the other cutter is moved away from the blank to relieve the cutting edges thereof from the same.

The above described relief mechanism is particularly efficient in that it operates to back the cutting edges away from the shoulder or apex of the helical cut while drawing the cutting tool from the groove or tooth being cut, obviating any possibility of the cutting edges marring any of the surfaces of the blank during such withdrawal. Fig. 26 diagrammatically illustrates this movement of the cutting tool. Assuming that the cutter 89 has completed its reciprocatory stroke, the relief mechanism operates to draw it away from the blank 19 in a direction indicated at X in Fig. 26. While the withdrawing or relief movement is taking place the reciprocating movement of the carriage 23 has been reversed and, coincidently with this, the relief device is acting to draw the cutting tool axially away from the blank in the direction indicated at Y in Fig. 26. The joint effect of components X and Y is a movement of the cutting tool in the direction indicated at Z in Fig. 26, whereby the cutting edges of the tool are relieved from the cut in the blank at an acute angle in respect to the axis of the blank. In the form shown the angle is approximately 45° but the acuteness of the angle of rearward movement can be varied within fairly wide limits.

The cutter shafts 91 and 92 extend to one side of the machine and are secured respectively to helical guides 142 and 143, guide 142 being hollow to permit shaft 92 to pass therethrough. In this instance, hollow shaft 91 is provided with a tapered end 91a that fits in a correspondingly tapered opening 142a in guide 142, a key 142b being provided to additionally insure rotative connection between these parts. The guide 142 is provided with a threaded extension 142c and the shaft 91 is threaded at 91b. A collar 91c is provided and is threaded within an opening 91d to fit the threads 91b on shaft 91 and within a counterbore 91e to fit the threads on extension 142c of guide 142. The threads 91b, formed on shaft 91, are of finer pitch than those formed on guide extension 142c so that upon rotation of the collar 91c in one direction the tapered end 91a of shaft 91 will be forced into the tapered opening 91d and locked therein, and upon rotation in the other direction will be withdrawn therefrom.

Figure 6:
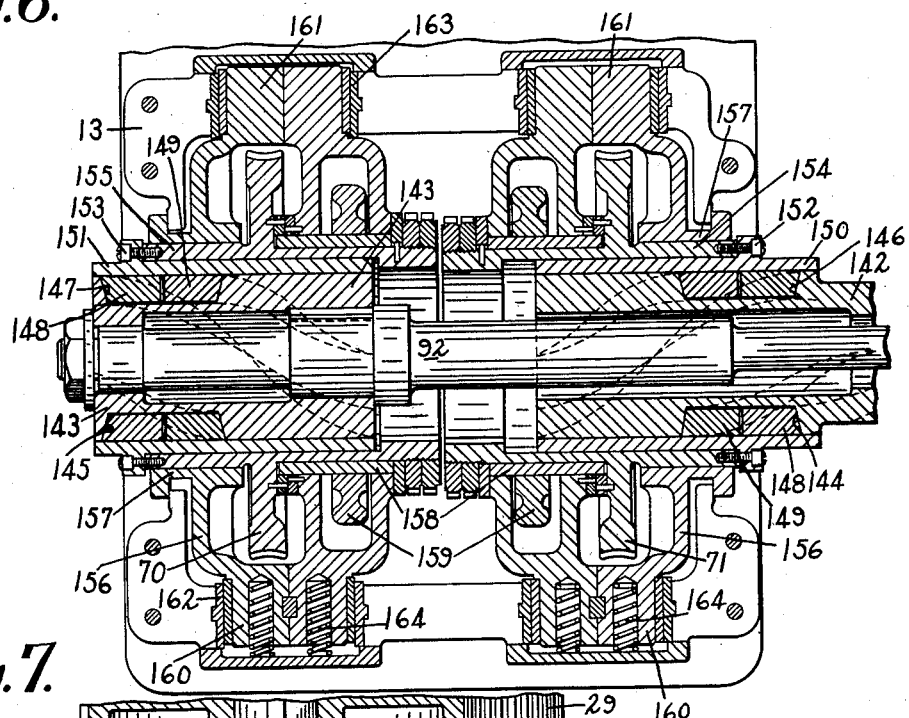
Fig. 6 is a sectional view on line 6—6 of Fig. 2.

Each of the helical guides is provided with a pair of helical grooves 144 and 146 in guide 142, and 145 and 147 in guide 143. The grooves are disposed in the peripheral surface of the guides at diametrically opposite sides thereof. The grooves 144 and 146 are in the form of a left-hand helix and grooves 145 and 147 are in the form of a right-hand helix. Each of the grooves are adapted to receive a guide nut, each of which is composed of a stationary part 148 and a movable part 149. The guides 142 and 143 are slidably mounted within sleeves 150 and 151 respectively, that are secured by means of screws 152 and 153 within hollow bearing hubs 154 and 155 respectively, that are secured to or formed as a part of worm wheels 71 and 70, respectively. (See Figs. 6, 8, and 9).

Each of the worm wheels 70 and 71 is rotatably supported within housing 13 by similar structure and, therefore, only one set of parts forming this structure will be described. The worm wheel 70 having the hollow bearing hubs 155 is supported in a frame 156 with the bearing hubs 155 journaled in bearings 157 and 158, disposed therein, bearing 158 being a sleeve member that is suitably secured to the frame and which forms a bearing for a swingable member 159. The frame 156 is provided with front and rear guides 160 and 161 respectively, that are received in guideways 162 and 163, respectively, formed in the front and rear walls respectively, of the housing 13. The cooperation of guides 160 and 161 with and in guideways 162 and 163, is such that the frame 156 is permitted to slide forwardly or rearwardly in respect to the machine. Compression springs 164, seated within suitable openings in the front guide 160, constantly urge the frame 156 rearwardly.

The swingable member 159 is provided with a downwardly directed bifurcated extension 165, that is adapted to slidably receive a block 166 in which the eccentric portion 167 of a pivot rod 168 is journaled. The member 159 is, therefore, pivoted upon rod 168 and the effective pivot point thereof is adjustable by rotating the rod 168 in the desired direction by means of a wrench in engagement with the outer end 169 thereof. The body portion of the member 159 encircles sleeve 158 and is provided with an upwardly directed arm 170. A cam follower 171 is secured to the upper end of arm 170 and has one end thereof in engagement with the cam 172, which is secured to shaft 76, within the housing 13, and has the other end thereof engaged by a compression spring 173 that constantly urges the follower 171 toward and into engagement with the peripheral camming surface of cam 172.

The rotation of rod 168 will cause the aforesaid pivot point of member 159 to be disposed either forwardly or rearwardly of its vertically aligned position with shaft 92 or 91, as the case may be. By this means the normal position of the mechanism in respect to the machine may be adjusted to adjust the position of the respective shaft 91 or 92 transversely with respect to its axis relatively to the blank 19.

The cam surface of cam 172 is timed to permit the arm 170 to swing and be maintained rearwardly during a certain period by the urge of spring 173, and to swing the arm forwardly and maintain it in such position during the remaining period of the rotation of cam 172. The above action on the part of cam 172 through the medium of the above described connections between member 159, frame 156, the worm wheel hubs 155, the sleeve 151 and the helical guide 143, will operate upon the cutter shaft 92 to move it forwardly or rearwardly with respect to the machine. Cam 172 being secured to shaft 76, which in turn is geared to shaft 80, upon which cam 136 is secured, will act coincidentally therewith, and cutter shaft 92 will be moved uniformly in its entirety toward or away from the gear blank being cut. A cam 174 also secured to shaft 76, through the same instrumentalities as those described above with respect to cam 172, operates coincidentally with cam 134, which is secured to shaft 80 to similarly move cutter shaft 91.

The stationary part 148 of each guide nut is rigidly secured to the inner surface of the respective sleeve 150 or 151, by screws 175, while the movable part 149 of each guide nut is slidably secured thereto for movement axially thereof, by means of a screw 176 that threads into the nut and passes through an elongated opening in the sleeve which is elongated longitudinally, with respect to the nut parts and the groove in which said nut is disposed. A pair of yoke members 177 are secured to the end of each sleeve 150 and 151 and overhang the ends of the movable nut parts 149. An adjusting screw 178 is threaded into the overhanging portion of each of said yoke members. The screw 178 is adapted to engage an end surface 179 of nut portion 149 to slidingly move this portion relatively to the stationary portion 148. The portion 148 is provided with short edge surface portions 180 and 181 disposed at either end thereof and that are in parallel with and directed axially with respect to the respective cutter shaft axis, and are inclined with respect to the sides of the grooves. The edge surface portions 180 and 181 of part 148 are in engagement with similarly formed and disposed edge surface portions 182 and 183 respectively, provided on part 149. Due to the cooperation of these edge surface portions the movement of the movable part 149 by the screw 178 will cause the edge surfaces 184 and 185 of parts 148 and 149, that are in engagement with the sides of the helical grooves in the helical guides 142 and 143, to tend to move away from each other and thereby more tightly engage the side walls of these grooves.

This arrangement permits the adjustment of the guide nut to compensate for wear and insures a smooth movement of the helical guides during the reciprocating movement thereof. By the above arrangement, the nut parts may be permitted to extend along the groove substantially the entire length of the respective sleeve 150 or 151, thus insuring sufficient surface contact for an efficient bearing. The provision of two guide nuts diametrically disposed in each of the sleeves, insures uniform twisting strains upon the parts and avoids the possibility of the respective cutter shaft being sprung out of alignment.

The work base 11 is slidable toward and away from the cutters 89 and 90 upon ways 15 and 16.

This operation may be manually performed by rotation of hand wheel 186, that is secured to the outer end of a shaft 187, journaled in a bearing 188 formed in the machine base 10 and retained therein against axial movement. The inner end of shaft 187 is threaded to fit within a nut 189 that is secured to an auxiliary base 190 (see Fig. 21). The auxiliary base 190 is slidably mounted upon the machine base 10 on ways 191 and 192, for movement forwardly or rearwardly in respect to the machine. The work base 11 is also adapted to ride upon ways 191 and 192. A relatively long bolt 193 extends through the work base 11 and is secured to the auxiliary base 190. A nut 194 that engages the end of a sleeve 195 is adapted to force the sleeve 195 against a block 196 to clamp the auxiliary base 190 to the ways 191 and 192 and therefore dispose it stationary with respect to base 10 (see Fig. 23). A stud bolt 197 secured to auxiliary base 190 and extending through a portion of the work base 11, by cooperation with a nut 198, may be used to secure auxiliary base 190 to base 11. By loosening nut 194 and tightening nut 198, the hand wheel 186 may be operated to move the work base 11 forwardly or rearwardly as desired.

A roller 199 is rotatably mounted upon the rear end of auxiliary base 190, and when nut 198 is loosened and nut 194 tightened, is engaged by the periphery of the cam 201 that is urged forwardly by compression springs 200. The cam 201 is secured to a shaft 202, journaled in the work base 11. The springs 200 (see Fig. 22) are seated in openings 203 formed in the auxiliary base 190, and act against a block 204 secured to the base 11 through screws 205 by which the tension thereof is adjustable, the screws 205 threadingly engaging plungers 206 that are slidably disposed in openings in base 11 and engage the springs 200.

The shaft 202 extends to the right-hand side of the machine and into a housing 207 formed on the base 11. A gear 208 and cams 209 and 210 are secured to the end of shaft 202, that is disposed in housing 207 (see Figs. 18 and 20). Gear 208 meshes with a pinion 211 secured upon one end of a short shaft 212 journaled in a bearing 213 formed on base 11. A bell crank lever 214 is rotatably mounted upon shaft 212 adjacent pinion 211. A gear 215 is secured to the other end of shaft 212, the teeth of which are adapted to mesh with the teeth of an interrupted toothed gear 216, that is rotatably mounted upon a hub portion 217 of the work index gear 59. The gear 216 is provided upon one end face thereof with bevel gear teeth 218, and upon the other end face with ratchet teeth 219. A spring pressed pawl 220 disposed in an opening in the hub portion 217 is adapted to engage the ratchet teeth 219.

The periphery of the beveled gear toothed portion 218 is cut away opposite the toothed portion 221 of gear 216 and peripherally beyond toothed portion 221 at each end thereof, as at 222 (see Figs. 18 and 19). The periphery of the beveled toothed portion 218, that is not cut away as at 222, is adapted to be received and to rotate in notches or grooves 223 formed in the periphery of a mask or plate 224, that is secured to an end face of gear 215 by screws 225. In this instance, only four grooves 223 are formed in the periphery of mask 224.

The bell crank 214 is provided with an arm 226, the outer end 227 of which is in engagement with the peripheries of cams 209 and 210. A groove 228 is formed in the periphery of cam 210, and a lug 229 is provided upon the periphery of cam 209, the former permitting the end 227 of arm 226 to drop therein and the bell crank 214 to rock in one direction and the latter to raise the end 227 and rock the bell crank 214 in another direction. Another arm 230 of the bell crank is provided with a roller 231 rotatably mounted thereon. The roller 231 engages an operating lever 232 of the cut-out switch 35, which electrically controls motor 34 through leads 233 and 234 and power supplying cables 235 and 236.

Another arm 237 provided on the bell crank 214, extends through the housing 207 at the front of the machine and visibly indicates to the operator the disposition of bell crank 214. For instance, when the arm end 227 is in groove 228 of cam 210, the arm 237 will be depressed into its lowermost position; when the arm end 227 is raised by lug 229 on cam 209 the arm 237 will be raised into its uppermost position as shown in dotted lines in Fig. 18, indicating that the switch 35 is open, and when the machine is in operation and the switch 35 is closed, arm 237 will be in its intermediate position, as shown in full lines. The position of switch lever 232 and arm 230 when the switch is open is also shown in dotted lines in Fig. 18.

An upper part or cover 238 is provided for a work index mechanism housing 57. The cover 238 is provided with an upwardly facing recess 239, in which is seated a journal box 240 in which end extensions 241 and 242 formed on worm 58 are journaled. The extensions 241 and 242 and worm 58, are hollow to permit axial movement of shaft 56 therethrough, shaft 56 being keyed to extension 241 by a key 243. The journal box 240 may be raised and lowered but is maintained against longitudinal movement relatively to the cover 238 by means of bolts 244 and 245, vertically elongated openings 246 being formed in the cover 238 and through which these bolts pass to permit vertical movement of box 240. The journal box 240 may be raised or lowered by an eccentric stud 247, which is journaled in cover 238 and has its eccentric member 248 in engagement with the box 240 in an opening provided therefor. The amount of upward movement imparted to the box 240 by the eccentric stud 247 is sufficient to raise the worm 58 out of mesh with the worm wheel 59 so as to permit the turning of wheel 59 manually by hand wheel 261, that is secured upon a shaft 262 journaled in the housing 57, and upon which a bevel pinion 263 is secured that is in mesh with the bevel teeth 218 of gear 216, when such operation is desired. By means of handles 259, provided upon the nuts of the bolts 244 and 245, the journal box 240 may be clamped in raised or lowered position.

The part or cover 238 is slidably mounted upon housing 57 for movement longitudinally with respect to the box 240 and substantially axially with respect to the axis of the worm 58. Cooperating surfaces 249 and 249ᵃ of the cover 238 and housing 57 respectively, are inclined downwardly toward the rear of the machine, and relative movement of these parts upon these surfaces is obtained by the rotation of a collared screw 250, that is threaded into housing 57. Collar 251 of the screw 250 engages the cover 238 in a groove 251ᵃ, provided in surface 249 thereof. By rotation of screw 250 the degree of mesh between the teeth of worm 58 and wheel 59 may be adjusted to compensate for wear. Bolts 260 may be tightened to maintain the cover 238 in its adjusted position.

A similar adjustment is provided between the worms 68 and 69 and worm wheels 70 and 71 of the cutter index mechanism, disposed in housing 13. The shafts 66 and 67 of the worms 68 and 69 respectively, are journaled in bearing carriers 252 that are slidably mounted upon the upper surface of frame 156, the cooperating surfaces 253 and 254 of which respectively are inclined downwardly toward the rear of the machine. The bearing carriers 252 are movable in respect to the frame 156 by means of a screw 255, that is provided with a collar 256 which is in engagement with the carrier 252 within a suitable groove formed in the surface 253 thereof. Bolts 257 and 258 may be tightened to hold the carrier 252 and retain worms 68 and 69 in their adjusted position.

The modified form of work index wheel drive mechanism illustrated in Figs. 24 and 25, comprises a cover or part 265 adapted to be slidably mounted upon the housing 57 that encloses the worm wheel 59. A worm 266 is journaled in the cover 265 and its form and manner of its connection with shaft 56 is similar to that described above with respect to worm 58. The arrangement whereby the teeth of worm 266 are moved out of mesh with the worm wheel 59, is of somewhat different form. In this instance, the worm end extensions 267 and 268 are journaled in bushings 269 and 270 respectively, extension 267 being axially removable from bushing 269 and extension 268, with bushing 270 being axially removable from the cover 265. A cap 271 threadingly engaging the outer end of bushing 270 also threadingly engages a plate 272 that is secured to the end of cover 265. The engagement between cap 271 and plate 272 is formed by interrupted screw threads 273 and 274, formed on each respectively, whereby by turning the cap 271 substantially a quarter of a revolution it may be drawn axially away from the threaded portion of plate 272. Being at the same time threadingly engaged with bushing 270 a continued axial movement of cap 271 will draw the bushing 270 and worm 266 out of the cover 265, the bushing 270 being secured to the worm 266 by clamping it thereon between thrust bearings 275 and 276 by means of nuts 277.

The operation of the machine as above described is as follows. Assuming that the gear blank 19 has been mounted upon the arbor 18, which is rotatably supported upon tail-stock 17 and drivingly connected to the face plate 20, that suitable cutters 89 and 90 have been mounted upon cutter shafts 91 and 92 respectively, and adjusted relatively to the gear blank 19, by adjustment of carriers 97 and 98 upon carriage 23, as above described, and that the change gears 53, 54, and 55 are of the proper ratio, the motor 34 may be started, which through belt 32 to pulley 31 and the associated shafts and gearing, as above described, will cause the carriage 23 to reciprocate and carry the cutters 89 and 90 back and forth across the face of the blank 19. The guide nuts that are disposed in the helical grooves formed in the helical guides 142 and 143, that are secured to cutter shafts 91 and 92 respectively, will impart a twisting movement to the cutters at each stroke thereof.

At the completion of each stroke the cutters are drawn from or moved toward the blank 19 by the action of the cutter supports 93 and 96, caused by the movement of members 122, due to the action of cams 134 and 136 and springs 138 therein, the extensions 123 and 124 of these members moving in the guideways 125 and 126 respectively, to effect the relief of the cutters from the work. The structure and combination of elements of this mechanism insures accurate and positive relief action for the cutters, which is performed in a quiet and smooth manner. Coincidentally with their relief movement at each cutter, the index mechanism therefor is likewise shifted by the novel structure described above, and including the frames 156 and cams 172 and 174, whereby no lateral strains are placed upon the cutter shafts and due to which they are retained in parallel and concentric to their respective axes. The frames 156 being spring controlled in one direction of their possible movement, the cutter index mechanisms, with the respective shafts controlled thereby, are substantially self-aligning whereby transverse strains upon either shaft in one direction will be relieved. The clutch 44 may now be shifted into clutched position whereby the blank 19 and cutters 89 and 90 through the associated gearing, and as above described, will be given a continuous gear tooth generating action whereby during the cutting operation the pinion-like cutters 89 and 90 will mesh with the teeth on the blank as they are being cut and generate the proper form therefor.

After starting the mechanisms as above described, the blank 19 may be fed into cutting position against the cutters by means of the hand wheel 186, after loosening nut 194 and tightening nut 198 for the purpose above described. After the blank 19 is in the desired position in respect to the cutters 89 and 90, the nut 198 is loosened and nut 194 tightened to release the work base 11 from possible movement by means of the hand wheel 186 and to place in operation the automatic feed-in mechanism for the blank.

The tightening of nut 194 clamps the auxiliary base 190 to the ways 191 and 192, and the loosening of nut 198 releases the work base 11 from the auxiliary base 190 and places it under the influence of springs 200, that urge it forwardly to insure positive engagement of the cam 201 with roller 199. The work base 11 is now free to slide upon ways 15 and 16 and ways 191 and 192 toward or away from the cutters under the control of cam 201, and the influence of springs 200.

The cam 201 is adapted to gradually force the work base 11 and blank 19 toward the cutters 89 and 90 during one revolution thereof against the action of springs 200 an amount substantially equal to the depth of the tooth being cut, due to the cam form provided upon its periphery. Being driven by shaft 202 the action of cam 201 is controlled by mechanism associated with the work index worm wheel 59, comprising gears 208, 211, mask 224, gear 215, interrupted gear 216, ratchet teeth 219 and pawl 220. In this instance, the interrupted gear 216 rotates with the worm wheel 59 and when its teeth 221 mesh with the teeth of gear 215 the latter is rotated substantially a quarter of a revolution. Gear 216 and wheel 59, therefore, make four revolutions to every one of gear 215, the mask 224, by the cooperation of the notches or grooves 223 therein with the uncut portion of the periphery of the beveled gear, toothed portion 218 of gear 216, retaining gear 215 against rotation during substantially three-quarters of each revolution of gear 216.

Gear 211 rotates with gear 215 and being in mesh with gear 208 causes rotation of shaft 202 and cam 201. The ratio of gear 211 to gear 208, in this instance, is such that gear 211 will make two revolutions while driving gear 208 one revolution. Gears 211 and 208 may be replaced with other gears to provide different speed ratios when conditions, such as difference in material, in the size of the gear being cut, or others, makes such changes desirable. In this instance however, the cam 201 will make substantially one complete revolution for every eight revolutions of the worm wheel 59 or of the blank 19, during which the blank, through the influence of the cam 201 as above described, will be fed at intervals uniformly toward the cutters, whereby the depth of the teeth being cut thereon will be uniformly increased until the required depth and shape of tooth has been formed.

After the proper form and depth of tooth has been cut upon blank 19, the lug 229 provided on cam 209, which has been rotating with cam 201, will engage arm 226 of bell crank 214 to rock the same whereby the arm 230 of this bell crank by the engagement of roller 231 with the switch lever 232 will swing the latter to open switch 35 and stop the motor 34. Substantially simultaneously with the opening of switch 35, the roller 199 will drop upon the lowermost portion 204 of the periphery of cam 201, whereby the springs 200 will act to draw the work base 11 and blank 19 forwardly away from the cutters 89 and 90.

It will be obvious that the machine illustrated and disclosed in this application is substantially completely automatic in its operation. When the blank is once in place and when the cutters have been properly adjusted so that they move up to the center line of the blank, the machine may be set into operation and will operate to produce the finished gears without further attention on the part of the operator.

During the operation of the machine, the work will be fed toward the cutters by the action of the cam 201 so that the cutters gradually cut more deeply into the metal of the blank and in time work to depth so as to form completely finished teeth. It will be observed that the cutters will have traveled over the entire surface of the blank several times, that is to say, the blank will have been turned by the index mechanism through several revolutions during one revolution of the cam so that before the work is finished full depth teeth will be cut over the entire surface of the blank. After the teeth have been cut to full depth the work is withdrawn from the cutters by springs 200 and the motor 34 is stopped. Due to these automatic operations an operator may attain to a plurality of machines whereby gears may be efficiently and economically manufactured in quantity.

I do not particularly claim herein the combination of a base, a work support, and means to slide said support upon the base in a series of interrupted steps during the rotation of the work a part of one revolution; a guide nut disposed in the helical groove which is adjustable relatively to the width of the groove to insure proper bearing therein; or cutter relief mechanism including a continuously rotatable cam as described and claimed in my Patent No. 1,814,348, July 14, 1931.

It will be obvious from the above that the machine, while having been described particularly with respect to its form and operation as applied to the formation of double helical gears, may also be operated, with slight changes in equipment as understood by mechanics familiar with such machines, to form single helical gears, straight toothed gears, sprocket wheels, splined shafts, and helical grooves in shafts or in flat surfaces, and that it can generate square, hexagonal, octagonal or similar contours upon the surfaces of rods and the like, to form the peripheries of cams, castellations, etc., and that a construction is provided whereby if desired the blank surface can be provided with various forms of intersecting grooves.

While I have shown and described a preferred embodiment of my invention, it will be understood that it is not to be limited to all the details shown, but is capable of modification and variation within the spirit of the invention and the scope of the appended claims.

What I claim is:

1. In a gear cutting machine, a frame, a carriage reciprocably mounted thereon, a cutter carrier adjustably mounted upon said carriage and having a surface in engagement with an adjacent surface on said carriage, and means acting transversely with respect to said surfaces to clamp one against the other to secure said carrier to said carriage, means to adjust said carrier upon said carriage by moving one relatively to the other in the direction of the reciprocating movement of said carriage, said means comprising a threaded rod on one of said parts and a thread engaging rotatable member on the other, and means extending to the front of the machine for actuating said rotatable member.

2. In a gear cutting machine, a reciprocable carriage, a cutter carrier mounted thereon means to adjust said cutter carrier relatively to and along said carriage, comprising a non-rotatable threaded rod secured to one of said parts and a rotatable thread engaging member carried by the other of said parts and cooperating with said threaded rod, and means extending to the front of the machine for actuating said rotatable member.

3. In a gear cutting machine of the type described, a frame, a reciprocable carriage on said frame, a cutter support mounted on said carriage for movement toward and away therefrom substantially at right angles thereto, and means to so move said cutter support comprising a positively movable part having an inclined portion and a substantially straight portion interposed between said support and said carriage, and movable transversely with respect to the direction of the reciprocating movement of said carriage.

4. In a gear cutting machine of the type described comprising a frame, a reciprocable carriage on said frame, a cutter support mounted on said carriage, said carriage and said support being movable relatively toward and away from each other, and means to so move said parts comprising a machine part interposed between said support and said carriage and having a substantially straight portion in engagement with one, and having an inclined portion acting against the other, said machine part being movable relatively to both and transversely with respect to the direction of the reciprocating movement of said carriage to cause one to be moved relatively toward and away from the other.

5. In a gear cutting machine of the type described, a carriage member having a cutter support member thereon, and means to cause a relative movement of one of said members toward and away from the other comprising a shiftable machine part having a straight portion and an inclined portion, the straight portion being mounted in and acting against one of the aforesaid members and the inclined portion being mounted in and acting against the other when said machine part is shifted to move one of said members relatively to the other as aforesaid.

6. In a gear cutting machine of the type described, a reciprocable machine part having another machine part movably mounted thereon, and means to move one of said parts relatively to the other toward and away therefrom comprising a member longitudinally movable with respect to its length and transversely with respect to the reciprocating movement of one of said machine parts, and having an inclined surface in engagement with one of said parts and having a substantially straight surface in engagement with the other of said parts.

7. In a gear cutting machine of the type described, a machine part having another machine part movably mounted thereon, one of said machine parts being reciprocable, and means to move one of said parts relatively to the other toward and away therefrom comprising a member longitudinally movable with respect to its length and transversely with respect to the reciprocating movement of one of said machine parts, and having an inclined surface in engagement with one of said parts and having a substantially straight surface in engagement with the other of said parts, and means to move said member in synchronism with the movement of said reciprocating machine part.

8. In a gear cutting machine of the type described, a machine part having another machine part movably mounted thereon, one of said machine parts being reciprocable, and means to move one of said parts relatively to the other toward and away therefrom comprising a member longitudinally movable with respect to its length and transversely with respect to the reciprocating movement of one of said machine parts, and having an inclined surface in engagement with one of said parts, and being in engagement with the other of said parts, and a rotatable cam in engagement with said member to move it at the completion of a stroke of said reciprocating machine part.

9. In a gear cutting machine of the type described, a cutter shaft, a supporting and driving mechanism for said shaft, said mechanism being mounted on said machine for sliding movement transversely with respect to the axis of said shaft, and means to so slide said mechanism comprising a member pivoted at one end, means to rock said member about its pivot, and means to adjust the pivot point thereof transversely with respect to said shaft.

10. In a gear cutting machine wherein a cutter is reciprocated across the face of a rotatable work blank, a work support slidably mounted upon a base for movement toward and away from said cutter, means to rotate the work on said work support, and means to move said work support toward said cutter, said last named means comprising a cam, means to rotate said cam intermittently in synchronism with said work rotating means, and means to intermittently restrain said cam against rotation.

11. In a gear cutting machine, a frame, a carriage reciprocably mounted thereon, a shaft secured rigidly in said carriage, a cutter carrier slidably mounted on said carriage and having means engaging said shaft, and means on said carrier to actuate said engaging means for moving said cutter carrier along said shaft to adjust it along said carriage in the direction of movement thereof, said means including an operating member extending toward the front of the machine.

12. In a gear cutting machine, a frame, a carriage reciprocably mounted thereon, a shaft secured rigidly in said carriage, a cutter carrier mounted on said carriage, and means on said carrier for moving said cutter carrier along said shaft to adjust it in the direction of movement of the carriage, said means including an operating member extending toward the front of the machine and there accessible for operation.

13. In a gear cutting machine, a frame, a carriage reciprocably mounted thereon, a shaft secured rigidly in said carriage, a pair of cutter carriers each having means engaging said shaft, and means on each of said carriers to actuate said engaging means thereon for independently moving each of said carriers along said shaft to adjust them along said carriage in the direction of reciprocating movement thereof, said means including an operating member extending toward the front of the machine.

14. In a gear cutting machine of the type described, a frame, a reciprocable carriage on said frame, a cutter carrier, a cutter support mounted on said cutter carrier for movement toward and away from the carriage, and means to move said cutter support comprising a positively movable part engaging both said support and carrier by passing through one and into the other, and means to move said part longitudinally with respect to its length.

15. In a gear cutting machine of the type described, a frame, a reciprocable carriage on said frame, a cutter carrier, a cutter support mounted on said cutter carrier for movement toward and away from the carriage at substantially right angles to the direction of reciprocation thereof, and means to move said cutter support comprising a member mounted in one of said parts for movement substantially at right angles to the reciprocating movement of said carriage, said member having an inclined surface bearing against another of said parts.

16. In a gear cutting machine of the type described, a frame, a reciprocable carriage on said frame, a cutter support mounted on said carriage for movement toward and away from the carriage, and means to move said cutter support comprising a member interposed between said parts and movable relatively thereto in a direction substantially at right angles to the reciprocation thereof to move the cutter carrier relatively to the carriage in a direction substantially at right angles to the reciprocating movement thereof, means to positively move said member in one direction, and spring means to return said member to its initial position.

17. In a gear cutting machine of the type described, a frame, a reciprocable carriage member on said frame, a cutter support mounted on said carriage for movement toward and away from the carriage, means to move said cutter support comprising a member passing therethrough and having its ends movably engaging the carriage member.

18. In a gear cutting machine, a cutter, a work support, automatically operable means to feed said work support toward the cutter comprising a rotatable cam, means to rotate the work, means to intermittently rotate said cam to effect such feeding movement during the rotation of the work and means to intermittently restrain said cam against rotation.

19. In a gear cutting machine of the type described, a cutter, a shaft upon which said cutter is mounted, index mechanism in which said shaft is carried and by which the shaft may be rotated, a yoke carrying said index mechanism, said yoke being pivoted for movement transversely of said shaft, and means to move said yoke about its pivot.

20. In a gear cutting machine, a main base, an auxiliary base slidable on said main base, a work base slidable on said main base, said auxiliary base and said work base being movable relatively one to the other, and means on one of said members engaging the other thereof to effect such relative movement.

21. In a gear cutting machine, a main base, an auxiliary base slidable on said main base, means secured to one of said members and engaging the other to move the auxiliary base on the main base, a work base also slidable on said main base, said auxiliary base and said work base being movable relatively one to the other, and means on one of said relatively movable members and engaging the other thereof to effect relative movement therebetween.

22. In a gear cutting machine, a main base, an auxiliary base slidable on said main base, means secured to one of said members and engaging the other to move the auxiliary base on the main base, a work base also slidable on said main base, said auxiliary base and said work base being movable relatively one to the other, and means on one of said relatively movable members and engaging the other thereof to effect relative movement therebetween, and means to connect said auxiliary base and said work base to prevent relative movement therebetween.

23. In a gear cutting machine, a main base, an auxiliary base slidable on said main base, means secured to one of said members and engaging the other to move the auxiliary base on the main base, a work base also slidable on said main base, said auxiliary base and said work base being movable relatively one to the other, and means on one of said relatively movable members and engaging the other thereof to effect relative movement therebetween, and means to connect said auxiliary base and said main base to prevent movement of the auxiliary base.

24. In a gear cutting machine, a main base, an auxiliary base slidable on said main base, means secured to one of said members and engaging the other to move the auxiliary base on the main base, a work base also slidable on said main base, said auxiliary base and said work base being movable relatively one to the other, and means on one of said relatively movable members and engaging the other thereof to effect relative movement therebetween, and means to secure the auxiliary base against movement on the main base, and means to connect the auxiliary base with the work base to prevent relative movement therebetween.

25. In a gear generating machine, a rotatable blank support, a reciprocable pinion shaped cutter, means to continuously rotate said blank support and said cutter in unison, and means to draw said cutter away from said blank support in a straight line at an acute angle to a line passing through the centers of said cutter and said blank support.

26. In a gear generating machine, a rotatable blank support, a reciprocable pinion shaped cutter, means to continuously rotate said blank support and said cutter in unison, and means to draw said cutter away from said blank support in a straight line directed at an angle to a common center line passing through the centers of both said cutter and said blank support.

27. In a gear generating machine, a rotatable blank support, a reciprocable pinion shaped cutter, means to continuously rotate said blank support and said cutter in unison, and means to draw said cutter away from said blank support in a straight line directed at an angle to a common center line passing through the centers of both said cutter and said blank support and in the direction of rotation of said blank support.

28. In a gear generating machine, a rotatable blank support, a reciprocable pinion shaped cutter, means to continuously rotate said blank support and said cutter in unison, means to draw said cutter away from said blank support in a straight line to relieve its cutting edge both from the bottom and side of the groove being cut in the blank, said means comprising a cutter support slidable away from the blank both at right angles to the face thereof and inclined in the direction of rotation of said blank support.

29. In a gear cutting machine of the type described, a frame, a reciprocable carriage on said frame, a cutter carrier, a cutter support mounted on said cutter carrier for movement toward and away from the carriage to dispose a cutter on said cutter support in inoperative and operative position respectively, stop means to positively limit the movement of said cutter support away from said carriage and means to move said cutter support comprising a positively movable part engaging both said cutter support and cutter carrier by passing through one and into the other.

30. In a gear cutting machine, a cutter supporting member, a work supporting member, means to reciprocate said cutter supporting member axially with respect to said work supporting member, a mechanism to rotate said members in synchronism with each other and with the reciprocating movement of said cutter supporting member, said mechanism comprising a worm, a worm wheel, and means to adjust said worm relatively to said worm wheel by drawing their respective centers together, said last named means including cooperating flat inclined surfaces slidable lengthwise one upon the other, and means to slide one of said inclined surfaces relatively to the other.

31. In a gear cutting machine, a cutter supporting member, a work supporting member, means to reciprocate said cutter supporting member axially with respect to said work supporting member, a mechanism to rotate said members in synchronism with each other and with the reciprocating movement of said cutter supporting member, said mechanism comprising a worm, a worm wheel, and means to adjust said worm relatively to said worm wheel by drawing their respective centers together, said last named means including a bearing support for said worm and a support for said worm wheel, each of said supports having an inclined surface in slidable engagement with an inclined surface on the other.

32. In a gear cutting machine, a cutter supporting member, a work supporting member, means to reciprocate said cutter supporting member axially with respect to said work supporting member, a mechanism to rotate said members in synchronism with each other and with the reciprocating movement of said cutter supporting member, said mechanism being mounted on said machine and including a drive shaft slidably supported by said mechanism, a worm mounted upon said shaft, a worm wheel adapted to mesh with said worm, and means to axially slide said shaft to adjust said worm relatively to said worm wheel by drawing their respective centers together, said means including cooperating inclined surfaces slidable lengthwise one upon the other.

33. In a gear cutting machine, a cutter supporting member, a work supporting member, means to reciprocate said cutter supporting member axially with respect to said work supporting member, a mechanism to rotate said members in synchronism with each other and with the reciprocating movement of said cutter supporting member, said mechanism being mounted on said machine and including a drive shaft supported by said mechanism, a worm mounted upon said shaft, a worm wheel adapted to mesh with said worm, means to adjust said worm relatively to said worm wheel by drawing their respective centers together, said last named means including a bearing support for said shaft and a support for said worm wheel, each of said supports having an inclined surface in slidable engagement with the inclined surface on the other, and means to slide said supports relatively to each other and axially with respect to said shaft.

34. In a gear cutting machine, a rotatable cutter mounted for reciprocating movement across the face of a gear blank, means to reciprocate said cutter, driving means for said reciprocating means, a rotatable work support, means to rotate said cutter and said work support in synchronism and to operate said cutter reciprocating means driving means including an electric motor, mechanism operable by loads in excess of the normal load upon one of said synchronized rotatable elements to prevent damage to said machine, said mechanism comprising clutch means between said cutter and work rotating means and said motor, spring means to normally retain said clutch means in clutched position, and means to unclutch said clutch means when the load carried thereby is in excess of the force exerted by said spring means, and means operated by a part of said clutch means to stop said electric motor whereby said cutter reciprocating means is stopped.

35. In a gear cutting machine, a rotatable cutter mounted for reciprocating movement across the face of a gear blank, means to reciprocate said cutter, driving means for said reciprocating means, a rotatable work support, means to rotate said cutter and said work support in synchronism and to operate said cutter reciprocating means driving means including an electric motor, mechanism operable by loads in excess of the normal load upon one of said synchronized rotatable elements to prevent damage to said machine, said mechanism comprising clutch means between said cutter and work rotating means and said motor, spring means to normally retain said clutch means in clutched position, said clutch means being releasable when the load carried thereby is sufficient to overcome the force exerted by said spring means, control means for said electric motor, and means actuated by the unclutching movement of said clutch means to operate said motor control means to stop said motor whereby said cutter reciprocating means is stopped.

36. In a gear cutting machine, a frame, a carriage reciprocably mounted on said frame, a threaded rod secured to said carriage and extending lengthwise thereof, a cutter carrier slidably mounted on a face of said carriage, a rotatable member on said carrier having threads cooperating with the threads on said rod and gear teeth about its periphery, a gear in mesh with the gear teeth on said member and a shaft to rotate said gear, said shaft being mounted on said carrier and extending away from said carriage and beyond said carrier.

37. In a gear cutting machine, a frame, a carriage reciprocably mounted on said frame, an elongated member secured to said carriage and extending lengthwise thereof, a cutter carrier slidably mounted on a face of said carriage, a rotatable member on said carrier, said rotatable member being adapted to cooperate with said elongated member to slide said carrier along said carriage, and a shaft in driving connection with said rotatable member, said shaft extending away from said carriage and beyond said carrier.

38. In a gear cutting machine, a frame, a carriage reciprocably mounted for horizontal movement on said frame, a cutter carrier mounted on said carriage, a cutter support slidably mounted on said carrier for movement toward and away from said carriage substantially at right angles to the direction of reciprocating movement thereof, means to so move said cutter support relatively to the carriage comprising a member slidably mounted in said carrier and in said support for movement substantially in a vertical plane, said member having an inclined surface in sliding engagement with the corresponding inclined surface on said carrier.

39. In a gear cutting machine, a frame, a carriage reciprocably mounted for horizontal movement on said frame, a cutter carrier mounted on said carriage, a cutter support slidably mounted on said carrier for movement toward and away from said carriage substantially at right angles to the direction of reciprocating movement thereof, means to so move said cutter support relatively to the carriage comprising a member slidably mounted in said carrier and in said support for movement substantially in a vertical plane, said member having an inclined surface in sliding engagement with the corresponding inclined surface on said carrier, and rotatable means engaging an end of said member to positively move said member in one direction.

40. In a gear cutting machine, a frame, a carriage reciprocably mounted for horizontal movement on said frame, a cutter carrier mounted on said carriage, a cutter support slidably mounted on said carrier for movement toward and away from said carriage substantially at right angles to the direction of reciprocating movement thereof, means to so move said cutter support relatively to the carriage comprising a member slidably mounted in said cutter support for movement transverse to the direction of the aforesaid movement of said cutter support, said member having an inclined extension at each end thereof slidingly disposed within correspondingly inclined openings in said carrier.

41. In a gear cutting machine, a frame, a carriage reciprocably mounted for horizontal movement on said frame, a cutter carrier mounted on said carriage, a cutter support slidably mounted on said carrier for movement toward and away from said carriage substantially at right angles to the direction of reciprocating movement thereof, means to so move said cutter support relatively to the carriage comprising a member slidably mounted in said cutter support for movement transverse to the direction of the aforesaid movement of said cutter support, said member having an inclined extension at each end thereof slidingly disposed within correspondingly inclined openings in said carrier, and means to slide said member lengthwise in one direction and means to urge said member lengthwise in the other direction.

42. In a gear cutting machine, a cutter, a shaft upon which said cutter is mounted, index mechanism in which said shaft is carried and by which the shaft may be rotated, a yoke about said shaft, said mechanism being supported in said machine for sliding movement transverse to the axis of said shaft, and said yoke being pivoted for movement transverse to the axis of said shaft.

43. In a gear cutting machine, a cutter, a shaft upon which said cutter is mounted, index mechanism in which said shaft is carried and by which the shaft may be rotated, a yoke about said shaft, said mechanism being supported in said machine for sliding movement transverse to the axis of said shaft, and said yoke being pivoted for movement transverse to the axis of said shaft, said yoke being operatively connected to said mechanism to slide the same when moved about its pivot, and means to pivotally move said yoke.

44. In a gear cutting machine wherein a cutter is reciprocated across the face of a rotatable work blank, a work support slidably mounted upon a base for movement toward and away from said cutter, means to rotate the work on said work support, and means to move said work support toward said cutter, said last named means comprising an auxiliary base mounted on said base, a rotatable cam on said work support in engagement with an abutment on said auxiliary base, and means drivingly connecting said cam with said work rotating means.

45. In a gear cutting machine wherein a cutter is reciprocated across the face of a rotatable work blank, a work support slidably mounted upon a base for movement toward and away from said cutter, means to rotate the work on said work support, and means to move said work support toward said cutter, said last named means comprising an auxiliary base adjustably mounted on said base, a rotatable cam on said work support in engagement with an abutment on said auxiliary base, means drivingly connecting said cam with said work rotating means, and means to adjust said auxiliary base to move the abutment thereon toward and away from said cam.

46. In a gear cutting machine wherein a cutter is reciprocated across the face of a rotatable work blank, a work support slidably mounted upon a base for movement toward and away from said cutter, means to rotate the work on said work support, and means to move said work support toward said cutter, said last named means comprising an auxiliary base mounted on said base, a rotatable cam on said work support in engagement with an abutment on said auxiliary base, and means drivingly connecting said cam with said work rotating means, said last named means comprising mechanism to rotate said cam at predetermined intervals during the rotation of said work.

47. In a gear cutting machine, a cutter supporting member, a work supporting member, means to reciprocate said cutter supporting member axially with respect to said work supporting member, and mechanism to rotate said members in synchronism with each other and with the reciprocating movement of said cutter supporting member, said mechanism comprising a supporting member, a worm gear, a worm gear holding member, a worm gear wheel in mesh with said worm gear, cooperating inclined surfaces between said supporting and holding members, and means to slide one of said members relatively to the other lengthwise along the inclined surfaces to adjust said worm gear and wheel toward and away from each other.

48. In a gear cutting machine, a cutter supporting member, a work supporting member, means to reciprocate said cutter supporting member axially with respect to said work supporting member, and mechanism to rotate said members in synchronism with each other and with the reciprocating movement of said cutter supporting member, said mechanism comprising a supporting member, a worm gear, a worm gear holding member, a worm gear wheel in mesh with said worm gear, said worm gear being mounted in said holding member for movement into and out of mesh with said worm gear wheel means to so move said worm gear, cooperating inclined surfaces between said supporting and holding members, and means to slide one of said members relatively to the other lengthwise along the inclined surfaces to adjust said worm gear and wheel toward and away from each other.

49. In a gear cutting machine, a pinion-shaped cutting tool, gear tooth shape generating mechanism including means to rotate a gear blank and said tool in unison with the teeth of each in mesh, and means to move said tool away from the gear blank to withdraw the teeth thereof out of mesh with the teeth of the gear blank, said tool moving means including a part slidably mounted for movement in an inclined direction in respect to the plane of the axes of both the gear blank and of said tool.

50. In a gear cutting machine, a pinion-shaped cutting tool, gear tooth shape generating mechanism including means to rotate a gear blank and said tool in unison with the teeth of each in mesh, and means to move said tool away from the gear blank to withdraw the teeth thereof out of mesh with the teeth of the gear blank, said tool moving means including a part slidably mounted in a guideway, said guideway being inclined away from the gear blank and in the direction of the rotational direction of the gear blank.

51. In a gear cutting machine, a pinion-shaped cutting tool, a gear tooth shape generating mechanism including means to rotatably support a gear blank, and means to rotate the gear blank and said cutting tool in unison with the teeth of both in mesh, and means to draw said tool away from the gear blank in a straight line at an angle to the plane of the axes of both the gear blank and said tool and in parallel with the end faces of both.

52. In a gear cutting machine, a pinion-shaped cutting tool, a gear tooth shape generating mechanism including means to rotatably support a gear blank, and means to rotate the gear blank and said cutting tool in unison with the teeth of both in mesh, a support for said tool, means to which said support is slidably mounted, said last named means including an inclined guideway directed away from the gear blank at substantially right angles thereto and in which said support is adapted to slide, the inclination of said guideway being disposed at an angle to the plane of the axes of both the gear blank and said tool.

53. In a gear cutting machine, a rotatable cutter support, a rotatable work support, means to continuously rotate one of said supports, automatically operable means to move one of said supports toward the other comprising a rotatable cam having a camming surface formed to uniformly advance the moved support toward the other during substantially an entire revolution of said cam, means to rotate said cam, means to interrupt the rotation of said cam at intervals during its rotation to permit the cutting tool to act upon the work in said work support during substantially one revolution of the latter, said interrupting means being automatically releasable to permit rotation of said cam after the interruption interval is ended.

54. In a gear cutting machine, a rotatable cutter support, a rotatable work support, means to continuously rotate one of said supports, automatically operable means to move one of said supports toward the other comprising a rotatable cam having a camming surface formed to uniformly advance the moved support toward the other during substantially an entire revolution of said cam, and means to rotate said cam comprising a cam shaft, and gearing drivingly connecting said cam shaft with said support rotating means, said gearing including means to interrupt the rotation of said cam shaft at intervals while said support rotating means continues to operate.

55. In a gear cutting machine, a rotatable cutter support, a rotatable work support, means to continuously rotate one of said supports, automatically operable means to move one of said supports toward the other comprising a rotatable cam having a camming surface formed to uniformly advance the moved support toward the other during substantially an entire revolution of said cam, means to rotate said cam comprising a cam shaft, gearing drivingly connecting said cam shaft with said support rotating means, said gearing including means to interrupt the rotation of said cam shaft at intervals while said support rotating means continues to operate, and interchangeable means included in said gearing to vary the length of the intervals during which the rotation of said cam shaft is interrupted.

56. In a gear cutting machine, a rotatable cutter support, a rotatable work support, means to continuously rotate one of said supports, automatically operable means to move one of said supports toward the other comprising a rotatable cam having a camming surface formed to uniformly advance the moved support toward the other during substantially an entire revolution of said cam, means to rotate said cam comprising a cam shaft, gearing drivingly connecting said cam shaft with said support rotating means, said gearing including means to interrupt the rotation of said cam shaft at intervals while said support rotating means continues to operate, said cam rotation interrupting means comprising a rotatable member in driving connection with said cam shaft, and means continuously driven by said support rotating means intermittently connectible to said rotatable member to drive the same.

57. In a gear cutting machine, a rotatable cutter support, a rotatable work support, means to continuously rotate one of said supports, automatically operable means to move one of said supports toward the other comprising a rotatable cam having a camming surface formed to uniformly advance the moved support toward the other an amount substantially equal to the depth of the gear tooth or groove being formed in the work on said work support during substantially one revolution of said cam, means to interrupt the rotation of said cam at intervals during its revolution to permit the cutting tool to act upon the work on said work support during substantially one revolution of the latter, and means to restrain said cam against rotation during the interrupted interval.

58. In a gear cutting machine of the type described, a frame, a reciprocable carriage on said frame, a cutter support mounted on said carriage for movement toward and away therefrom substantially at right angles thereto, and means to so move said cutter support comprising a positively movable part passing through said support and engaging said carriage, said part being slidably mounted in both for transverse movement with respect to the direction of the reciprocating movement of said carriage, and means to so move said part.

59. In a gear cutting machine of the type described comprising a frame, a reciprocable carriage on said frame, a cutter support mounted on said carriage, said carriage and said support being movable relatively toward and away from each other, and means to so move said parts comprising a machine part disposed within said support and engaging said carriage and having an inclined portion acting against said support, said machine part being slidably mounted for transverse movement with respect to the direction of the reciprocating movement of said carriage, and means to so move said machine part.

WILLIAM E. SYKES.